United States Patent [19]

Guest

[11] Patent Number: 5,607,193
[45] Date of Patent: Mar. 4, 1997

[54] TUBE COUPLINGS

[76] Inventor: John D. Guest, 'Iona ', Cannon Hill Way, Bray,, Maidenhead, Berkshire SL6 2EX, United Kingdom

[21] Appl. No.: 372,591

[22] Filed: Jan. 13, 1995

[30] Foreign Application Priority Data

Jan. 13, 1994 [GB] United Kingdom .................. 9400585

[51] Int. Cl.$^6$ .............................................. F16L 37/092
[52] U.S. Cl. ...................... 285/308; 285/322; 285/351; 285/906
[58] Field of Search ................................. 285/322, 323, 285/308, 351, 906

[56] References Cited

U.S. PATENT DOCUMENTS

| | | | |
|---|---|---|---|
| 4,128,264 | 12/1978 | Oldford | 285/41 |
| 4,310,185 | 1/1982 | Bartholomew | 285/369 |
| 4,524,995 | 6/1985 | Bartholomew | 285/54 |
| 4,526,411 | 7/1985 | Bartholomew | 285/305 |
| 4,541,658 | 9/1985 | Bartholomew | 285/319 |
| 4,601,497 | 7/1986 | Bartholomew | 285/319 |
| 4,669,757 | 6/1987 | Bartholomew | 285/55 |
| 4,681,351 | 7/1987 | Bartholomew | 285/319 |
| 4,778,203 | 10/1988 | Bartholomew | 285/111 |
| 4,869,534 | 9/1989 | Ketcham | 285/24 |
| 4,915,136 | 4/1990 | Bartholomew | 138/89 |
| 4,915,421 | 4/1990 | Dennay, Jr. | 285/39 |
| 4,918,077 | 4/1990 | Behrens | 514/284 |
| 4,925,217 | 5/1990 | Ketcham | 285/93 |
| 4,927,185 | 5/1990 | McNaughton | 285/39 |
| 4,936,544 | 6/1990 | Bartholomew | 251/149 |
| 4,944,536 | 7/1990 | Bartholomew | 285/319 |
| 4,946,205 | 8/1990 | Washizu | 285/319 |
| 4,948,175 | 8/1990 | Bartholomew | 285/39 |
| 4,981,586 | 1/1991 | Bartholomew | 210/435 |
| 5,000,614 | 3/1991 | Walker | 403/326 |
| 5,002,244 | 3/1991 | Holbury | 248/68.1 |
| 5,027,861 | 7/1991 | Gute | 138/45 |
| 5,033,513 | 7/1991 | Bartholomew | 138/109 |
| 5,042,848 | 8/1991 | Shiozaki | 285/277 |
| 5,063,968 | 11/1991 | Bartholomew | 138/109 |
| 5,067,754 | 11/1991 | Bartholomew | 285/319 |
| 5,181,751 | 1/1993 | Kitamura | 285/39 |

FOREIGN PATENT DOCUMENTS

| | | |
|---|---|---|
| 0146997 | 1/1984 | European Pat. Off. . |
| 0333948 | 3/1988 | European Pat. Off. . |
| 0448790 | 10/1991 | European Pat. Off. . |
| 0485214 | 5/1992 | European Pat. Off. . |
| 0597711 | 5/1994 | European Pat. Off. . |
| 3310385 | 10/1983 | Germany . |
| 388426 | 6/1989 | Germany . |
| 1520742 | 8/1978 | United Kingdom . |
| 1573757 | 8/1980 | United Kingdom . |
| 2087021 | 5/1982 | United Kingdom . |
| 2131903 | 6/1984 | United Kingdom . |
| 2166834 | 5/1986 | United Kingdom . |
| 2240149 | 7/1991 | United Kingdom . |
| 2249150 | 4/1992 | United Kingdom . |
| WO88/06252 | 8/1988 | WIPO . |
| WO90/13752 | 11/1990 | WIPO . |

Primary Examiner—Dave W. Arola
Attorney, Agent, or Firm—Baker & Daniels

[57] ABSTRACT

The disclosure relates to a tube coupling having a coupling body with a throughway open at one end to receive a tube and an open ended housing on the body projecting from one end through which a tube may extend into the throughway in the body. A collet is located in the housing having an annular part with resilient legs projecting towards the open end of the housing and terminating in jaws to engage an upset on the tube to hold the tube in the coupling body. The housing has an end region remote from its coupling body in which the collet jaws are constrained against expansion to release the tube and an intermediate region in which the ends may expand. A collet has arms projecting into and held in the throughway of the coupling body when a tube is present to restrain the collet so that the collet jaws are prevented from moving beyond the ends of the region of the housing to a position in which they could expand and release the tube.

22 Claims, 3 Drawing Sheets

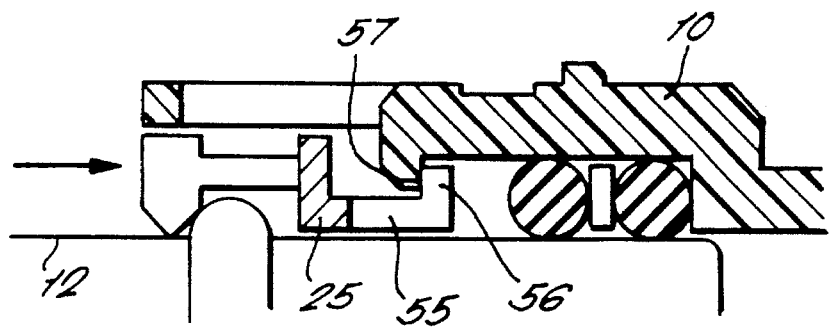
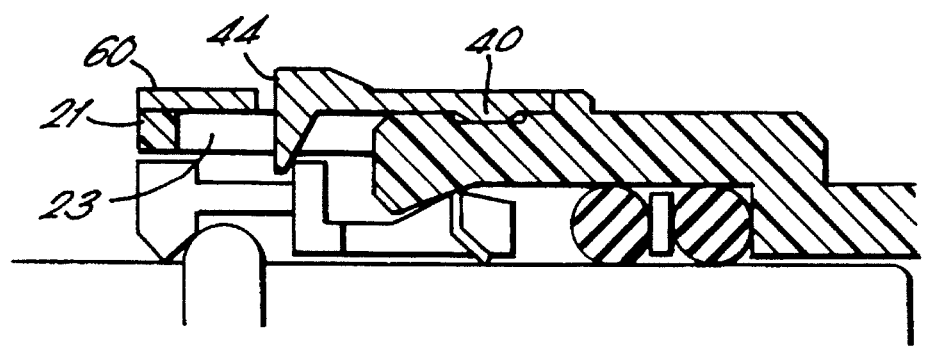
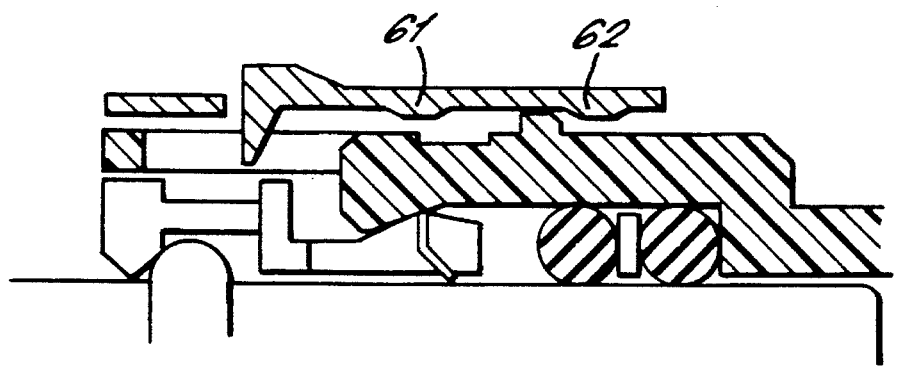

TUBE COUPLINGS

BACKGROUND OF THE INVENTION

1. Field of the Invention

This invention relates to tube couplings and in particular to couplings utilising a collet arrangement in a coupling body to receive and lock a tube in place automatically when a tube is inserted in the body.

2. Background Prior Art

Examples of such couplings are described and illustrated in U.K. Patent Publications Nos. 1,520,742, 1,573,757 and 2,131,903. In certain applications it is desirable to provide a secondary holding arrangement for a tube should the primary collet arrangement fail to grip the tube for any reason and such an arrangement may make use of an up-set formed on the tube adjacent its end. Our European Patent Application No. 93309027.6 shows certain arrangements for achieving this. The object of this invention is to simplify and improve further the provision of a dual locking for the tube in a coupling body.

SUMMARY OF THE INVENTION

This invention provides a tube coupling comprising a coupling body having a throughway open at one end to receive a tube, an open ended housing on the body projecting from said one end thereof through which a tube may extend into the throughway and the body, a collet located in the housing having an annular part with resilient legs projecting therefrom towards the open end of the housing and terminating in means to engage a formation on the tube to hold the tube in the coupling body, the housing having an end region remote from the coupling body in which the collet ends are constrained against expansion to release a tube held thereby and an intermediate region in which the ends may expand to release a tube, and means on the collet projecting into and held in the throughway of the coupling body when a tube is present to restrain the collet so that the free ends of the collet legs are prevented from moving beyond the end region of the housing to a position in which they could expand and release the tube.

BRIEF DESCRIPION OF THE DRAWINGS

FIG. 5 is a similar view to FIG. 1 showing a single collet tube locking arrangement;

FIG. 6 shows a modified form of the coupling body and collet release of FIG. 2;

FIG. 7 shows a further modification to the arrangement of FIG. 6; and

DESCRIPTION OF THE PREFERRED EMBODIMENTS

Figure 1:
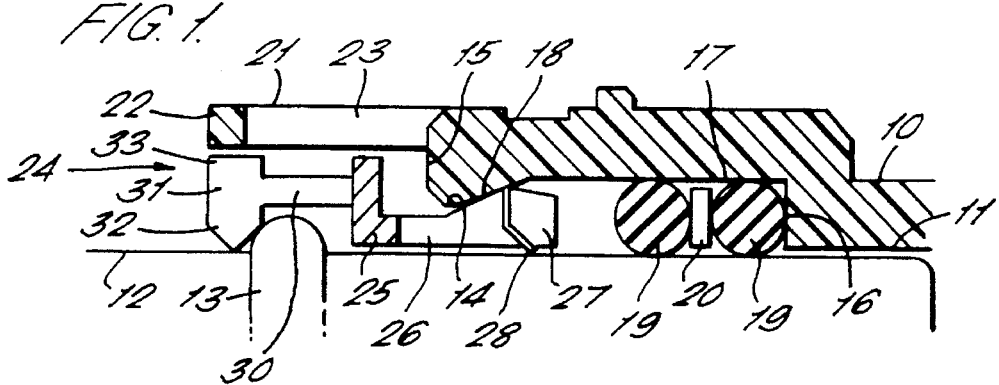
FIG. 1 is a sectional view through a tube coupling having a coupling body for receiving and holding a tube having an up-set adjacent the tube end with a dual collet formed for receiving and locking the tube to the coupling body.

Referring firstly to FIG. 1 of the drawings, there is shown a tube coupling comprising a coupling body 10 having a throughway 11 to receive an end part of a tube 12 to be secured to the coupling body. The tube has an annular up-set 13 adjacent the end of the tube which plays a part in locking the tube end to the coupling body as described below.

The throughway 11 has an open end 14 in an end face 15 of the coupling body 10. Towards its open end, the throughway is stepped outwardly at 16 to form an enlarged diameter section 17 which, adjacent the open end, is formed with a sharply tapering section 18. A pair of O-ring seals 19 are located in the enlarged section 17 with a washer 20 between the O-rings. The O-rings are constrained axially within the enlarged section 17 of the throughway between a shoulder 16 and a collet arrangement to be described below to provide a seal between the encircling surface of the throughway and the outer surface of a tube located in the throughway.

The end 15 of the coupling body is formed with an integral cylindrical housing 21 extending from the coupling body and terminating in an end 22. The housing is formed with spaced longitudinally extending slots 23 stopping short of the end of the housing for a purpose to be described below.

A dual form collet indicated generally at 24 is disposed in the coupling body/housing. The collet comprising an annular head 25 from which a first set of resilient legs 26 project axially through the open end 14 of the coupling body into the throughway and are formed with enlarged heads 27 which engage with the aforesaid tapered cam surface 18 adjacent the open end of the throughway. Metal teeth 28 are embodied in the heads and project on the inner sides thereof to engage and grip the surface of the tube 12 inserted into the coupling body. Thus the movement of the collet outwardly of the coupling body causes the heads 27 to be forced inwardly by the tapered cam surface 18 forcing the teeth 28 into the surface of a tube to grip and hold the tube in the coupling body.

The other part of the dual collet formation 24 comprises a further set of collet legs 30 extending from the opposite side of the annular element 25 away from the coupling body and terminating in radially extending heads 31 projecting inwardly of the legs to form abutments 32 and slightly outwardly to form stops 33. The abutments 32 of the secondary collet are engageable behind the up-set 13 on the tube 12 to provide a further retainer for holding the tube in the coupling body.

The collet assembly 24 is dimensioned so that when the primary collet engaging in the tapered throughway in the coupling body is in its tube locking position, the heads of the secondary collet 31 are located in the open end of the sleeve 21 and the stops 32 are closely spaced from the encircling end region of the sleeve to prevent the collet heads 31 from expanding radially and thereby releasing the up-set 13 on the tube. When it is required to release the tube from the coupling body, a tool is inserted into the open end of the sleeve to displace the dual collet and sleeve slightly inwardly to release the gripping action of the primary collet and to locate the heads 31 of the secondary collet opposite the slots 23 in the sleeve. With the collet retained in that position, the tube can be extracted causing the heads to expand into the slots and the tube can then be withdrawn from the coupling body.

Figure 2:
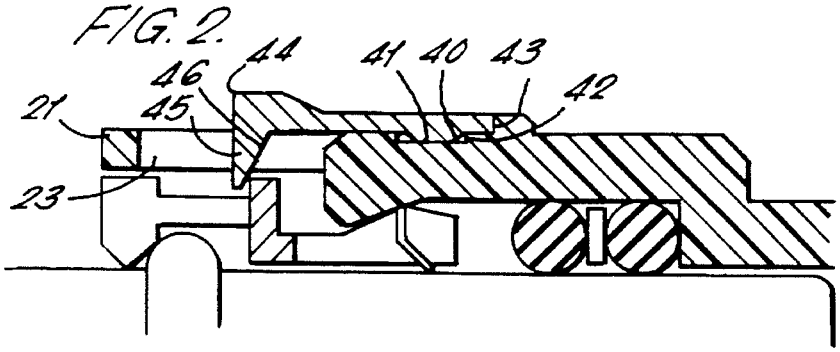
FIG. 2 is a similar view to that of FIG. 1 showing a first form of collet release arrangement.

Reference is now made to FIG. 2 of the drawings which shows a modification to the arrangement of FIG. 1. A tube coupling body is provided with a "built-in" arrangement for release of the collet comprising a sleeve 40 encircling the end part of the coupling body and formed with an enlarged internal rib 41 which snaps into a groove 42 encircling the outside of the sleeve. The end of the sleeve engages encircling shoulder 43 on the coupling body. The sleeve is formed with a number of resilient legs 44 which overhang the end of the coupling body and have radially inwardly extending cam elements 45 extending through the slots 23 in the sleeve 21 to engage the outer side of the annular element 25 of the dual collet arrangement. The cam elements 45 have inclined ramp faces which engage the outer corner of the annular element 25 of the collet formation and depressing the cam element inwardly causes the dual collet arrangement to be displaced inwardly towards the coupling body thereby releasing the primary collet within the coupling body and moving the heads 31 of the secondary collet into alignment with the slots 23 in the sleeve to allow release of the secondary collet.

Figure 3:
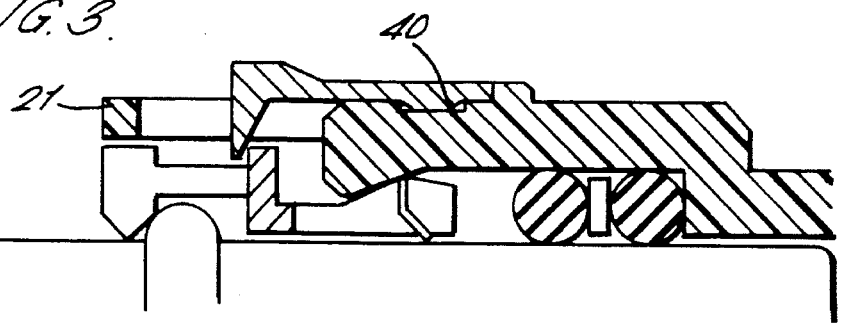
FIG. 3 is a similar view to FIG. 2 showing a modified coupling body construction.

FIG. 3 shows a further arrangement in which the housing 21 is formed integrally with the sleeve 40 rather than with the coupling body but is otherwise similar to the arrangement of FIG. 2.

Figure 4:
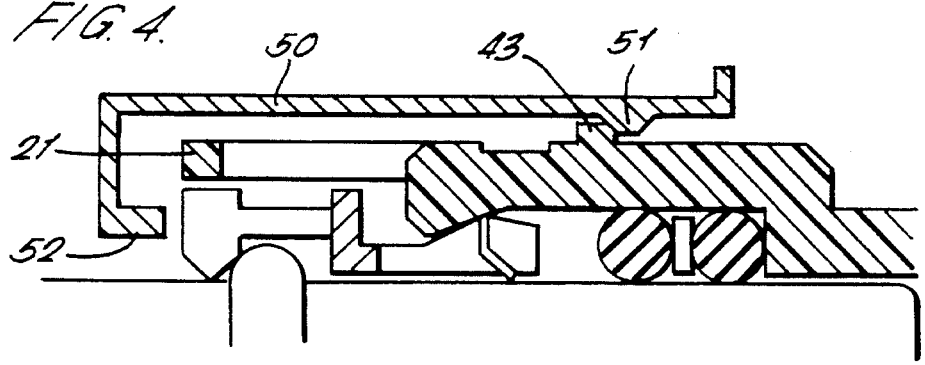
FIG. 4 is a similar view to FIG. 1 showing an alternative collet release arrangement.

FIG. 4 of the drawings shows a further collet release arrangement comprising a cover 50 mounted on the coupling body for sliding movement. Outward movement is restricted by engagement of an integral inwardly extending abutment 51 in the sleeve with the annular shoulder 43 on the coupling body referred to earlier.

The sleeve 50 extends beyond the open end of the housing 21 and is formed with an in-turned return 52 for engaging the heads 32 of the secondary collet in the open end of the housing for displacing the collet arrangement inwardly for release of the primary and secondary collets as described earlier.

FIG. 5 shows a simplified version of the arrangement of FIG. 1 in which the primary collet is replaced by a number of legs 55 extending from the annular element 25 of the collet into the coupling body and formed with upstanding stops 56 at their ends. The open end of the coupling body 10 is formed with an in-turned shoulder 57 with which the stops are engageable to prevent detachment of the collet assembly from the coupling body when a tube 12 is present in the coupling body.

FIG. 6 of the drawing shows a similar arrangement to that of FIG. 2 with the provision that the sleeve 40 has an extended portion beyond the legs 44 as indicated at 60 which fits around the end part of the housing 21 to close the outer ends of the slots 23 and thereby prevent ingress of dirt and also to provide an improved appearance for the fitting.

FIG. 7 of the drawings shows a modification of the arrangement in FIG. 6 in which the sleeve 40 is mounted for axial movement on the coupling body between spaced annular stops 61, 62.

Figure 8:
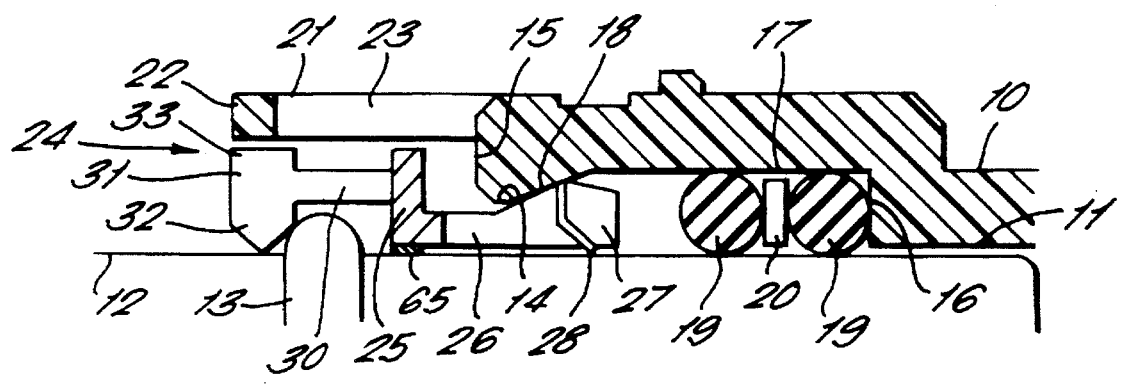
FIGS. 8 and 9 show further modified forms of the couplings of FIG. 1.

In some applications it may be desirable to provide a positive resistance to entry of the tube into the tube coupling which has to be overcome by application of extra force which drives the tube into the coupling and into engagement with the seals and ensures that the annular up-set 13 on the tube has snapped through the heads of the secondary collet 31 so that the tube is fully locked in the tube coupling. Reference should be made to my UK Patent Application No. 9402758.8 in which a number of means for providing such a resistance are described and illustrated including provisions within the throughway in the coupling body adjacent the seals and in the collet itself. By way of example, FIG. 8 illustrates a modified form of the embodiment of FIG. 5 in which the annular head 25 of the dual form collet 24 has an inner rib 65 encircling its inner periphery through which the tube 10 has to be forced before it can be engaged with the seals. In applying an excess force to push the tube through the annular rib, the force carries the tube fully into the coupling body engaging the tube with the seals 19 and ensures that the up-set 13 on the tube has snapped through the jaws 31 of the secondary collet.

Figure 9:
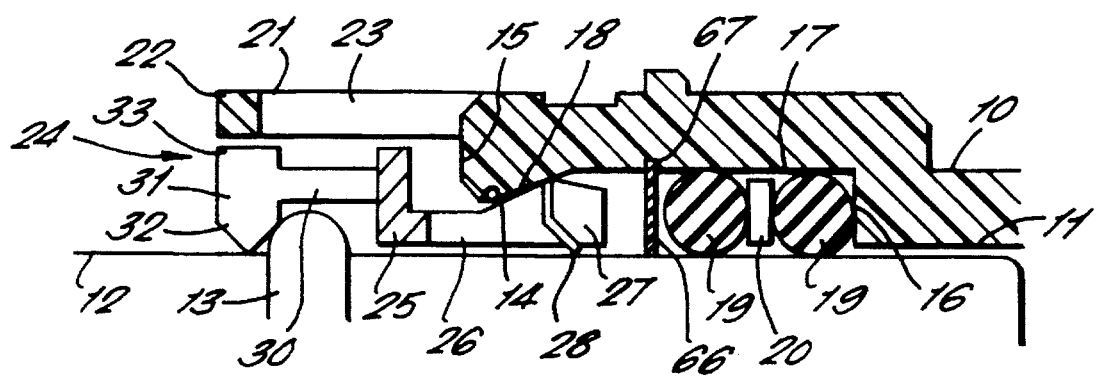

FIG. 9 shows a further arrangement in which an annular deformable diaphragm 66 is mounted in a groove 67 encircling the throughway in the coupling body adjacent the seals 19. The inner diameter of the diaphragm is slightly less than the outer diameter of the tube 11 so that when the tube is inserted in the coupling body, an excess force has to be applied to the tube to drive it through the diaphragm thus deforming the diaphragm. In applying the excess force, the tube is driven on through the seals 19 and the up-set 13 on the tube is engaged behind the jaws 31, of the secondary collet. The diaphragm can take any of the forms described and illustrated in my UK Patent Application No. 90402758.8.

I claim:

1. A tube coupling comprising:

a coupling body having a first throughway open at one end to receive a tube, a housing projecting from said one end of the coupling body and having a second throughway extending from a first end of the housing located proximal to the coupling body to a second end of the housing located distal from the coupling body, wherein said second throughway is axially aligned with said first throughway such that the tube can extend through the second throughway of the housing and into the first throughway of the coupling body, a collet located for axial movement in said throughways, said collet having a substantially annular part located in the second throughway and formed with retention means which extend into said first throughway and which engage with a portion of the coupling body disposed in said first throughway for limiting axial movement of the collet in an axial direction away from the coupling body, the annular part of the collet being further provided with a plurality of resilient legs projecting toward the second end of said housing and terminating in inwardly extending projections which engage a formation on the tube to hold the tube in the collet, and wherein the housing has an end region proximal to the second end of the housing for engaging the collet legs at a limit of the collet movement in an axial direction away from the coupling body such that the collet legs are constrained against radial outward movement in order to prevent release of the tube from the collet, and wherein the housing has a recess means disposed in an intermediate region between said end region and the coupling body such that said recess means overlie the collet legs at a limit of collet movement in an axial direction towards the coupling body for allowing the collet legs to expand radially outward to release said formation on the tube and thereby allow the tube to be extracted from the coupling body.

2. A tube coupling as claimed in claim 1, wherein the end region of the housing closely encircles the ends of the collet legs when the latter are engaged with the tube formation to prevent expansion of the legs.

3. A tube coupling as claimed in claim 1, wherein the recess means comprises a plurality of recesses into which the free ends of the collet legs can expand when aligned therewith to allow release of the tube.

4. A tube coupling as claimed in claim 3, wherein the recesses in the housing are formed by radial slots in the housing to receive the free ends of the legs of the collet.

5. A tube coupling as claimed in claim 1, formation on the tube comprises an annular enlargement encircling the tube.

6. A tube coupling as claimed in claim 5, wherein the inwardly extending projections of the collet legs comprise inwardly extending abutments.

7. A tube coupling as claimed in claim 1, wherein the housing is formed integrally with the coupling body.

8. A tube coupling as claimed in claim 1, further comprising a sleeve and including mounting means for mounting the sleeve on the coupling body and restraining the sleeve against axial movement with respect to the coupling body.

9. A tube coupling as claimed in claim 8, wherein said mounting means has a part which encircles the coupling body and is formed with an annular projection around the inner surface which engages in an annular groove encircling the coupling body to hold the sleeve on the body and prevent axial movement of the sleeve with respect to the body.

10. A tube coupling as claimed in claim 1, wherein means are provided on the coupling body for displacing the collet towards the coupling body to move the ends of the legs from the end region of the housing to the intermediate region to allow release of the tube.

11. A tube coupling as claimed in claim 10, wherein the means to displace the collet comprise an axially sliding cover mounted on the coupling body and extending over the body past the second end of the housing and formed with an inner sleeve which projects into the second end of the housing to engage the ends of the collet legs at the second end of the housing and to displace the collet inwardly towards the coupling body such that the sliding movement of the cover moves the ends of the collet legs into said intermediate region for release of a tube from the coupling body.

12. A tube coupling as claimed in claim 10, wherein the collet displacing means comprise radially displaceable cam elements mounted on the coupling body for engaging the annular part of the collet when depressed into engagement therewith.

13. A tube coupling as claimed in claim 12, wherein the cam elements are formed integrally with the sleeve on the tube coupling body.

14. A tube coupling as claimed in claim 1, wherein the means to restrain the collet from axial movement with respect to the coupling body comprise a further collet formed integrally with the first collet and comprising arms extending axially from said annular part into the throughway in the coupling body and formed with enlarged heads within the coupling body, the open end of the throughway being formed with a cam surface which tapers towards the open end and with which the enlarged ends of the arms are engageable to be displaced inwardly into gripping engagement with the tube in the coupling body with movement of the collet further outwardly of the coupling body.

15. A tube coupling as claim in claim 1, wherein the means to restrain the collet against movement away from the coupling body comprise stop members extending from the annular part of the collet into the throughway of the coupling body and having an abutment at the ends thereof which engage an inwardly facing shoulder formed around the open end of the throughway in the coupling body.

16. A tube coupling as claimed in claim 1, wherein the throughway of the coupling body is formed with sealing means to engage the outer surface of the tube to form a seal therewith between the throughway and tube.

17. A tube coupling as claimed in claim 16, wherein said sealing means comprise at least one O-ring seal disposed in the throughway of the coupling body to provide a seal between the surface of the throughway and the tube.

18. A tube coupling as claimed in claim 1, wherein means are provided for creating a resistance to entry of the tube into the throughway prior to engagement of the collet with the tube so that a force applied to the tube to overcome the resistance also overcomes any resistance offered by the collet to ensure that the tube is fully engaged in the coupling.

19. A tube coupling as claimed in claim 18, wherein the resistance means comprises a deformable annular member located in the throughway of the coupling body between the collet and sealing means.

20. A tube coupling as claimed in claim 19, wherein the deformable annular member has an inner peripheral portion engageable and deformable by insertion of the tube.

21. A tube coupling as claimed in claim 18, wherein said resistance means has an annular deformable element encircling the inner periphery of the annular part of the collet to resist insertion of the tube through the collet.

22. A tube coupling comprising:

a coupling body having a first throughway open at one end to receive a tube, a housing projecting from said one end of the coupling body and having a second throughway extending from a first end of the housing located proximal to the coupling body to a second end of the housing located distal from the coupling body, wherein said second throughway is axially aligned with said first throughway such that the tube can extend through the second throughway of the housing and into the first throughway of the coupling body, a collet located in said throughways and capable of axial movement in said throughways between a first axial position at which the collet is disposed at a limit of axial movement in an axial direction into the coupling body and a second axial position at which the collet is disposed at a limit of axial movement in an axial direction away from the coupling body, wherein said collet comprises:

a head disposed in the second throughway which engages a portion of said throughways in order to limit further axial movement of the collet in an axial direction into the coupling body when the collet is at the first axial position;

retention means extending from said head for engaging a portion of said throughways for limiting further axial movement of the collet in an axial direction away from the coupling body when the collet is at the second axial position, a plurality of collet legs extending from said head towards the second end of said housing, each collet leg terminating in an inwardly extending projection for engaging a formation on the tube to hold the tube in the collet, wherein each said collet leg is resiliently expandable in an outward direction away from said formation on said tube from a first position at which the projection of each said collet leg engages said formation on said tube to a position at which the projection of each said collet leg is disengaged from said formation on said tube, and wherein the housing has an end region disposed proximal to the second end of the housing, wherein said end region prevents the projection of each said collet leg from disengaging from said formation on said tube when the collet is disposed at the second axial position, and wherein the housing includes recess means in an intermediate region of the housing for allowing the projection of each said collet leg to disengage from said formation on said tube when the collet is in the first axial position.

* * * * *